United States Patent [19]

Alsbury et al.

[11] Patent Number: 5,094,572
[45] Date of Patent: Mar. 10, 1992

[54] SPADE DRILL FOR HARD MATERIAL

[75] Inventors: Herbert W. Alsbury; Robert A. Sheffler, both of San Diego, Calif.

[73] Assignee: Thomas Grismer, San Diego, Calif.

[21] Appl. No.: 445,285

[22] Filed: Dec. 4, 1989

[51] Int. Cl.$^5$ .............................................. B23B 51/00
[52] U.S. Cl. ..................................... 408/229; 408/228
[58] Field of Search ............................... 408/227–229, 408/199, 211; 76/108 R

[56] References Cited

U.S. PATENT DOCUMENTS

| 2,889,725 | 6/1959 | Turton et al. | 408/228 |
| 2,977,828 | 4/1961 | Strickland | 408/228 |
| 3,116,654 | 1/1964 | Nider | 408/228 |
| 3,975,110 | 8/1976 | Kraiss | 408/229 X |

FOREIGN PATENT DOCUMENTS 8303563 10/1983 PCT Int'l Appl. ................. 408/228

OTHER PUBLICATIONS

Page 130 Sandwik Drill Catalog, Published no later than 1987.
Page 28 Carbro Drill Catalog, Published no later than 1987.
Two pages SGS Tool Catalog, Series 104 and 106, Published no later than 1987.
Page 8 Solid Carbine Spade Drills Catalog, Published no later than 1987.

Primary Examiner—Larry I. Schwartz
Assistant Examiner—Robert Schultz
Attorney, Agent, or Firm—Henri J. A. Charmasson

[57] ABSTRACT

A flat drill for boring holes through hard metals and high heat resistance materials such as hard metal and fiberglass. The flute or fluid portion forms a spade with slightly cylindrically concave faces which tend to distally converge. The cutting edges at the base of the drill have a negative rake angle, but a relatively high clearance for this type of drill. The lateral leading edges have a positive rake angle, but are strengthened by cylindrically convex flanks. Nose splits form a small but relatively keen small central burrowing edge which stabilizes the drill.

6 Claims, 1 Drawing Sheet

SPADE DRILL FOR HARD MATERIAL

BACKGROUND OF THE INVENTION

This invention relates to drills, and more specifically to drills intended for work on hard materials and materials with a high heat resistant alloys such as hardened tool steel, die steel and other similar steels or fiberglass and composites. The toughest drills are commonly made of carbide in spiral flute configuration. The pressure and heat resistance to which they are subjected usually calls for a simple geometry with a relatively wide angle of cutting edge. In the art, a wide angle of cutting edge or nose angle means an angle of more than 59 degrees as measured from the axis of the tool. A 59 degree angle between the cutting edge and the axis is felt by some to equalize the thrust and torsion to best advantage; that is the proper balance between the pressure required for feeding the drill through the metal versus the power required to turn the drill. The acuity of keenness of the cutting edge also called the lip angle is an important factor which determines the strength of the tool and its durability. The lip angle is a combination of the rake angle, that is the slant of the forward face of the tool in relation to its axis, and of the clearance angle, the slant of the underface of the cutting tool. A positive rake angle i.e. when the front face slants upwardly and backwardly increases the keenness of the tool but greatly reduces its strength. A clearance angle of 12 degrees is common in most drills. Another characteristic which is critical in drill design for work on hard material is the shape, depth and length of the flute or fluid portion. Any fluting tends to decrease the strength of the tool and its ability to withstand high pressure and high torques. Flat spade drills have a simplified geometry with a relatively short fluid portion and no rake angle. They constitute the toughest type of tool which is particularly indicated for working on hard material. Conventional spade drills however, are usually very unstable and require the predrilling of a small leading bore. The length of a conventional carbide spade drill seldom exceeds twice the spun diameter. They usually have a very low clearance angle which leads to very high pressure and consequently high temperature operation which make them particularly unsuitable for working with high heat resistance materials such as heat resistant alloys, fiberglass and composites.

There is an acute need for a tough drill which would have all the basic favorable characteristics of a spade drill, but would operate at low pressure and temperature, and could drill up to 70 rockwell material on a C-scale.

SUMMARY OF THE INVENTION

The principal and secondary objects of the invention are to provide an improvement in spade-type drills used for working on hard and heat resistant alloys in order to obtain lower pressure and temperature, and higher stability. Those and other objects are achieved by a spade drill which has a positive rake angle but a unusually high clearance angle wherein the keenness of the leading edges axis increased by a slight curvature of the face, and where the pressure and temperature are further reduced by tapering the width of the face from the tip toward the shaft, and where a trangular nose split acts as a leader with a relatively acute burrowing edge. This last feature stabilizes the tool and precludes the need for predrilling. The negative rake angle considerably increases the strength of the flute which can extend to more than three times the spun diameter.

DESCRIPTION OF THE PREFERRED EMBODIMENT OF THE INVENTION

Figure 1:
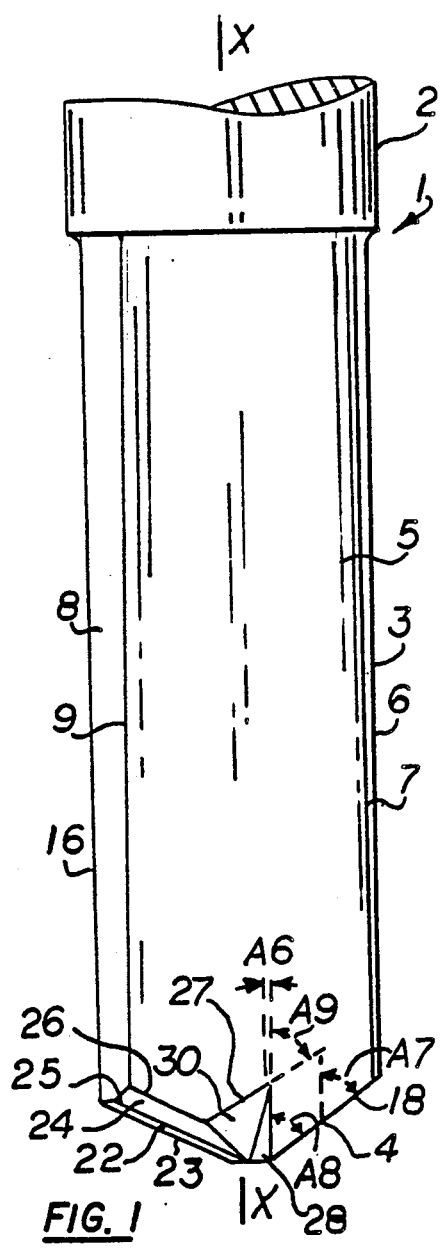
FIG. 1 is a front elevational view of the spade drill.
Figure 2:
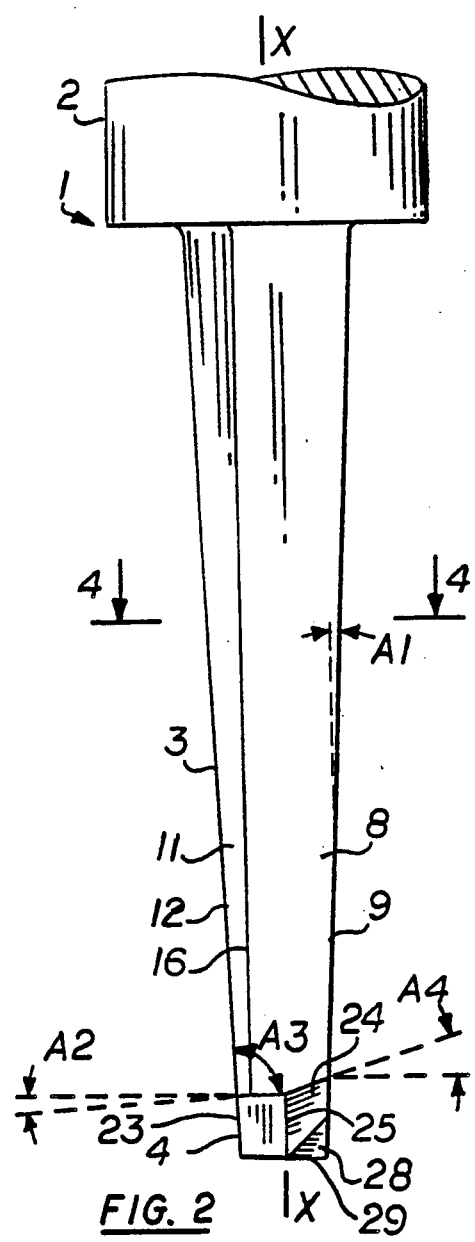
FIG. 2 is a side elevational view thereof.
Figure 3:
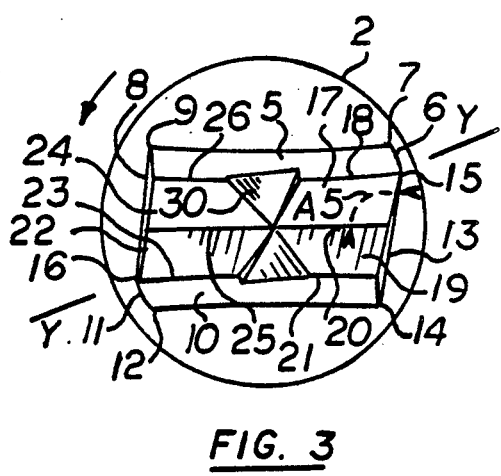
FIG. 3 is a distal end view thereof.
Figure 4:
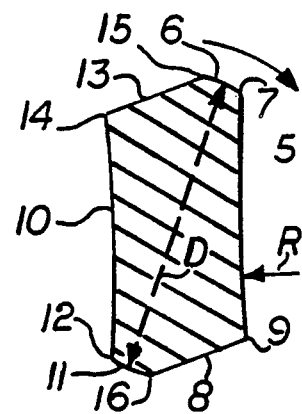
FIG. 4 is a cross-sectional view taken along line 4—4 of FIG. 2.

Referring now to the drawing, there is shown a flat drill 1 comprising a cylindrical shank 2 adapted for mounting the drill on a drilling machine, lathe or the like. The drill is designed to bore a hole through hard material along a drilling axis X—X passing through the geometrical center of the drill. A fluid portion of the drill extends coaxially from the shank to form a two-faced spade 3. The spade has a V-shaped nose 4 at its distal end. The entire spade lies within a drill cylinder defined by the drilling axis X—X, a spun diameter D and the length L which is generally equal to three times the spun diameter D. The drill comprises two symmetrical halves separated by a plane P defined by the drilling axis X—X and the line Y—Y. The first half of the spade comprises a first face 5 with a slight spherical concavity defined by a radius R equal to approximately 50 times the spun diameter. A first flank 6 converges along one of its longest dimensions with the first face to define a first leading edge 7. The flank 6 has a convexity defined by the spun diameter D, is parallel to the drilling axis and distal from it by a distance equal to half the spun diameter D. Accordingly, when the drill is spun, the surface of the flank is tangent to and defines the drill cylinder, that is the size of the hole to be bored. The cylindrical concavity of the faces 5 gives a positive rake angle to the leading edge. The latter is strengthened, however, by the cylindrical convexity of the flanks 6.

On the opposite side of the first face, a first spine 8 has a flat surface which converges along one of its longest dimensions with the first face to form a first trailing edge 9.

The second half of the spade comprises second face 10, a second flank 11 converging with a second face to form a second leading edge 12, and a second spine 13 which converges with the second face to form a second trailing edge 14. Each face 5, 10 tapers down widthwise from the nose 4 toward the shank by factor of 0.05 percent. This provides clearance and prevents drag. Conversely, the adjacent flank and spines taper down from the shank 2 toward the nose 4. The two symmetrical halves of the drill meet along clearance edges 15 and 16 at the convergence of the flanks and spines of opposite halves.

The distance between the two opposite faces tapers down from the shank toward the nose which define a negative rake angle A1 of one and a half to five degrees.

The V-shaped nose 4 also has two symmetrical halves. A first flat clearance base 17 converges with the leading half of the first face 5 to form a first cutting edge 18. The first clearance base 17 has a relatively large clearance angle A2 of 7 to 10 degrees which approaches the clearance angle of conventional drills.

This clearance angle combines with the negative rake angle A1 to give an actual lip angle or cutting angle A3 of 35.5 to 45 degrees to the cutting edge 18. The tapering of the faces 5, 10 and these various angles not only have been determined as the most desirable compromise between acuity and strength of the drill; but they greatly contribute to the reduction of the pressure and temperature about the cutting edges. The distal tapering of the faces contributes to the strength and rigidity of the tool, but causes a slightly negative rake angle at the cutting edge 18. No tapering or an inverse tapering would increase the keenness of the edge but would greatly weaken the drill. Similarly, a larger clearance angle A2 would increase the keenness of the cutting edge, but would reduce the strength and life of the tool.

Behind the first clearance base 17 lies a first flat relief base 19 at a end relief angle A4 of approximately 35 degrees. The first relief base converges with the first clearance base 17 to form a first relief edge 20. At the other end, the first relief base 19 converges with the trailing half of the second face 10 to form a first end-relief edge 21.

The second half of the V-shaped nose 4 comprises a second clearance base 22 converging with the leading half of the second face 10 to form a second cutting edge 23. A second relief base 24 converges with the second clearance base 22 to form a second relief edge 25, and the other end of the second relief base converges with the trailing half of the first face 5 to form a second end-relief edge 26. The clearance, relief and lip angles are symmetrical to those in the other half of the nose.

The spines 8, 13 are angled in relationship to the relief edges 20, 25 and the faces 5, 10 by a spin-end-relief angle A5 of 60 to 70 degrees. It should be noted that each flank at its base converges with both one of the clearance bases 17, 22 and one of the relief bases 19, 24. The narrow flanks 6 and 11 combine with the high spin-end relief angle A5 to reduce the lateral pressure and heat.

The clearance bases and the relief bases are all generally symmetrical and their common width is generally equal to one-fifth to one-fourth the spun diameter D.

The V-shaped nose 4 is further characterized by a pair of triangular splits. The first triangular split 27 is cut in the tip of the first face 5. The first split has a first triangular sharing face 28 which converges at the base with the first clearance base 17 to form an acute burrowing edge 29. On one side the first sharing face converges with the leading half of the first face, and on the other side converges in a concave angle with a first triangular chip-breaking face 30. The base of the first chip-breaking face converges with the second relief base 24, and its other sides converges with the first face 5. The sharing face has a rake angle A6 of 5 to 10 degrees. The first cutting edge 18 and the second cutting edge 23 each lies within a nose angle A7 of 60 to 70 degrees with the axis X—X. Accordingly, the lip angle A8 of the burrowing edge which is a combination of the positive sharing face rake angle A6 and the nose angle A7 varies between 50 and 60 degrees (100% to 120% drill point). The aperture angle A9 that the first split 27 defines in the first face 5 is approximately 50 degrees. While the burrowing edge 29 of the split is very keen, its strength results from the shallowness of the split. The split acts as a leader which keeps the drill in line and precludes the need for any kind of pre-drilling.

It has been determined that the range of dimensions specified above are applicable to drills designed for boring a variety of hard materials including heat resistance metals, hard metals, and composites. Rake angles, relief angles and clearance angles may be increased for added acuity at the expense of strength and durability according to specific needs and applications.

While the preferred embodiment of the invention has been disclosed, other embodiments may be devised without departing from the spirit of the invention and the scope of the appended claims.

What is claimed is:

1. A flat drill for boring holes of a certain spun diameter along a drilling axis through hard metals or high heat resistance materials which comprises:
   a cylindrical shank centered on the drilling axis, and a fluid portion extending coaxially from the shank and confined within the spun diameter;
   said fluid portion forming a spade comprising first and second symmetrical faces convergingly extending from the shank, and terminating into a V-shaped nose forming two symmetrical clearance bases, and two symmetrical and directionally opposite cutting edges;
   each of said cutting edges being defined by a negative rake angle of one of said faces in relationship to said axis, and by a clearance angle of more than 6 degrees between one of the clearance bases of said V-shaped nose and a plane normal to said axis;
   wherein each of said faces has a triangular split at the tip of said nose;
   said split forming a sharing face generally normal to the surface of the face and converging with a base of said V-shaped nose to form a burrowing edge; and
   the surface of each face is concave.

2. The drill of claim 1, wherein said sharing face has a positive rake angle in relationship to said axis.

3. A flat drill for boring holes of a certain spun diameter along a drilling axis through hard metals or high heat resistance materials which comprises:
   a cylindrical shank centered on the drilling axis and a fluid portion extending coaxially from the shank and confined within the spun diameter;
   said fluid portion forming a spade comprising:
   first and second symmetrical faces convergingly extending from the shaft and terminating into a V-shaped nose;
   a first flank converging with the first face to form a first leading edge;
   a first spine converging with said first flank to form a first clearance edge;
   the second face converging with said first spine to form a second trailing edge;
   a second flank converging with said second face to form a second leading edge;
   a second spine converging with said second flank to form a second clearance edge;
   said second spine converging with said first face to form a first trailing edge;
   said V-shaped nose comprising:
      a first flat clearance base converging with a first half of said first face to form a first cutting edge; and
      a second flat clearance base converging with a first half of said second face to form a second cutting edge;
   wherein said flanks have a cylindrical convexity defined by said spun diameter; and
   each of said faces is cylindrically concave.

4. The drill of claim 3, wherein each of said faces has a triangular cavity split at the tip of said nose;

said split forming a sharing face generally normal to the surface of the face and converging with a clearance base of said V-shaped nose to form a burrowing edge.

5. The drill of claim 4, wherein said sharing face forms a positive raking angle to said burrowing edge.

6. The drill of claim 5, wherein said first clearance base forms a clearance angle between 7 and 10 degrees.

* * * * *